United States Patent
Hill et al.

(10) Patent No.: US 6,470,189 B1
(45) Date of Patent: Oct. 22, 2002

(54) METHOD AND APPARATUS IN A WIRELESS TRANSCEIVER FOR SEEKING AND TRANSFERRING INFORMATION AVAILABLE FROM A NETWORK SERVER

(75) Inventors: Thomas Casey Hill, Trophy Club; Slim Souissi; Steven J. Goldberg, both of Fort Worth, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/408,251

(22) Filed: Sep. 29, 1999

(51) Int. Cl.[7] .............................. H04B 7/00; H04Q 7/24; G06F 15/16
(52) U.S. Cl. .................... 455/517; 455/66; 455/518; 370/338; 709/217
(58) Field of Search ........................... 707/10; 709/219, 709/217, 222; 455/66, 509, 517, 518, 519, 579, 520, 41; 370/338, 401

(56) References Cited

U.S. PATENT DOCUMENTS

| 5,231,634 | A | * | 7/1993 | Giles et al. ................. 370/348 |
| 5,666,661 | A | * | 9/1997 | Grube et al. ................ 455/509 |
| 5,745,483 | A | * | 4/1998 | Nakagawa et al. ......... 370/335 |
| 5,781,860 | A | * | 7/1998 | Lopponen et al. .......... 455/426 |
| 5,930,703 | A | * | 7/1999 | Cairns ........................ 455/418 |
| 5,995,500 | A | * | 11/1999 | Ma et al. .................... 370/337 |
| 6,034,951 | A | * | 3/2000 | Du .............................. 370/328 |
| 6,134,587 | A | * | 10/2000 | Okanoue .................... 709/222 |
| 2001/0012757 | A1 | * | 8/2001 | Boyle | |
| 2001/0039181 | A1 | * | 11/2001 | Spratt | |

FOREIGN PATENT DOCUMENTS

GB            2316271        *  2/1998

* cited by examiner

Primary Examiner—Vivian Chin
Assistant Examiner—Charles N. Appiah
(74) Attorney, Agent, or Firm—R. Louis Breeden; Roland K. Bowler, II

(57) ABSTRACT

A first transceiver (122) detects (402) a need for desired information available from a network server (108). In response to detecting the need and before contacting the network server, the first transceiver attempts (412) to obtain the desired information from another transceiver of a plurality of wireless transceivers near the first transceiver, thereby potentially eliminating a necessity for the first transceiver to contact the network server to obtain the desired information.

16 Claims, 4 Drawing Sheets

METHOD AND APPARATUS IN A WIRELESS TRANSCEIVER FOR SEEKING AND TRANSFERRING INFORMATION AVAILABLE FROM A NETWORK SERVER

FIELD OF THE INVENTION

This invention relates in general to wireless communication systems, and more specifically to a method and apparatus in a wireless transceiver for seeking and transferring information available from a network server.

BACKGROUND OF THE INVENTION

Wireless communication systems for serving the connectivity needs of portable transceivers are rapidly evolving into linked, multi-speed wireless networks. For example, a wireless wide-area network (WAN) may provide relatively low speed connectivity throughout a metropolitan area, while numerous wireless short range networks (SRNs) also may exist throughout the area for providing short range high speed connectivity where needed. Portable transceivers that are capable of peer-to-peer communications, e.g., Bluetooth devices, also can create ad hoc SRNs with one another that can operate independently of fixed portions of the wireless communication system.

Sometimes a portable transceiver can develop a need for information that is available from a network server. The information can be of many different types, and a good example is server-assisted Global Positioning System (GPS) information, which can greatly enhance the sensitivity and accuracy of a GPS receiver that may be used by the portable transceiver for location determination. Typically, the network server has been centrally located, e.g., at the site of a central controller of the wireless communication system, and has been accessed through the wireless WAN. Accessing the network server for assisted location information can generate substantial traffic in the wireless WAN when a large number of the portable transceivers are GPS-equipped. This traffic is undesirable, as it can increase system latency and potentially can overload the wireless WAN.

Thus, what is needed is a method and apparatus in a wireless transceiver for seeking and transferring information that is available from a network server. Preferably, the method and apparatus will operate to substantially reduce the wireless WAN traffic required to seek and transfer the information.

SUMMARY OF THE INVENTION

An aspect of the present invention is a method in a first transceiver of a plurality of wireless transceivers for seeking and transferring desired information what is available from a network server. The method comprises the steps of detecting a need for the desired information; and in response to the detecting step and before contacting the network server, attempting to obtain the desired information from another transceiver of the plurality of wireless transceivers near the first transceiver, thereby potentially eliminating a necessity for the first transceiver to contact the network server to obtain the desired information.

Another aspect of the present invention is a first transceiver of a plurality of wireless transceivers for seeking and transferring desired information that is available from a network server. The first transceiver comprises a receiver for receiving the desired information, and a transmitter for transmitting the desired information. The first transceiver further comprises a processing system coupled to the receiver and coupled to the transmitter for processing the desired information. The processing system is programmed to detect a need for the desired information; and in response to detecting the need and before contacting the network server, to attempt to obtain the desired information from another transceiver of the plurality of wireless transceivers near the first transceiver, thereby potentially eliminating a necessity for the first transceiver to contact the network server to obtain the desired information.

DETAILED DESCRIPTION OF THE DRAWINGS

Figure 1:
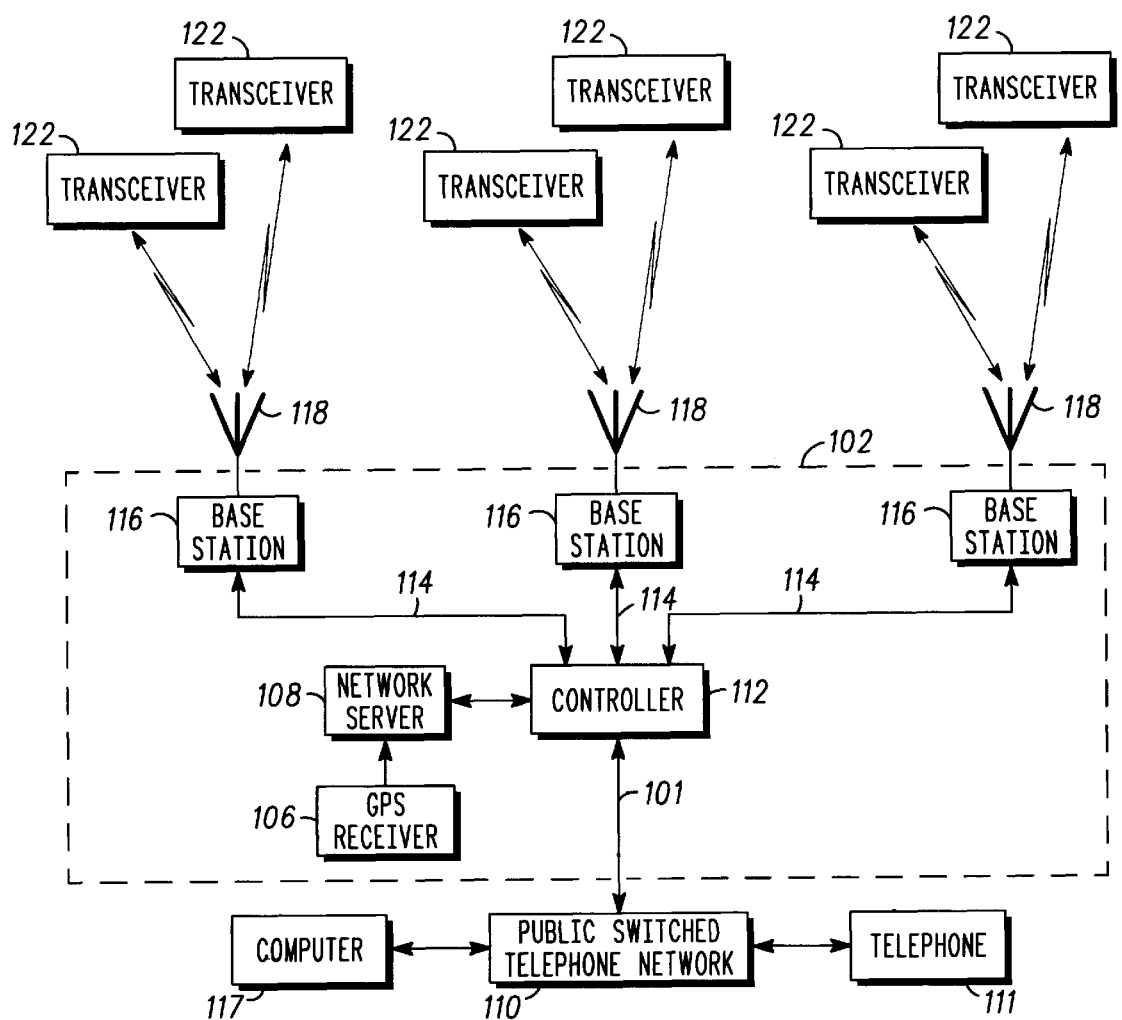
FIG. 1 is an electrical block diagram of an exemplary wireless communication system in accordance with the present invention.

Referring to FIG. 1, an electrical block diagram depicts an exemplary wireless communication system in accordance with the present invention, comprising a fixed portion 102 including a controller 112 and a plurality of conventional base stations 116, the communication system also including a plurality of transceivers 122. The base stations 116 preferably communicate with the transceivers 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention. The hardware of the base stations 116 is preferably a combination of the RF-Orchestra!™ transmitter and the RF-Audience!™ receiver manufactured by Motorola, Inc. The transceivers 122 are preferably similar to PageWriter™ 2000 data transceivers, also manufactured by Motorola, Inc., and also utilize software modified in accordance with the present invention. It will be appreciated that other similar hardware can be used as well for the controller 112, the base stations 116, and the transceivers 122.

Each of the base stations 116 transmits RF signals to the transceivers 122 via an antenna 118. The base stations 116 preferably each receive RF signals from the plurality of transceivers 122 via the antenna 118. The RF signals transmitted by the base stations 116 to the transceivers 122 (outbound messages) comprise selective call addresses identifying the transceivers 122, and data messages originated by a message originator, as well as commands originated by the controller 112 for adjusting operating parameters of the radio communication system. The RF signals preferably transmitted by the transceivers 122 to the base stations 116

(inbound messages) comprise responses that include scheduled messages, such as positive acknowledgments (ACKs) and negative acknowledgments (NAKs), and unscheduled messages, such as registration requests and requests for items of information. It will be appreciated that, alternatively, another wireless communication technology, e.g., infrared technology, can be used to communicate between the base stations 116 and the transceivers 122.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. The controller 112 is also coupled to a conventional network server 108 for providing information requested by the transceivers 122. The network server 108 is preferably coupled to a GPS receiver 106 for cooperating with the network server 108 to provide server-assisted GPS information to the transceivers 122.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. For example, for peer-to-peer and short range, e.g., ten meter range, communications, it is preferred that Bluetooth technology and protocol be utilized. It will be further appreciated that the present invention is applicable to many different types of wireless communication systems, including cellular telephone systems, trunked dispatch systems, and voice and data messaging systems, to name a few.

Figure 2:
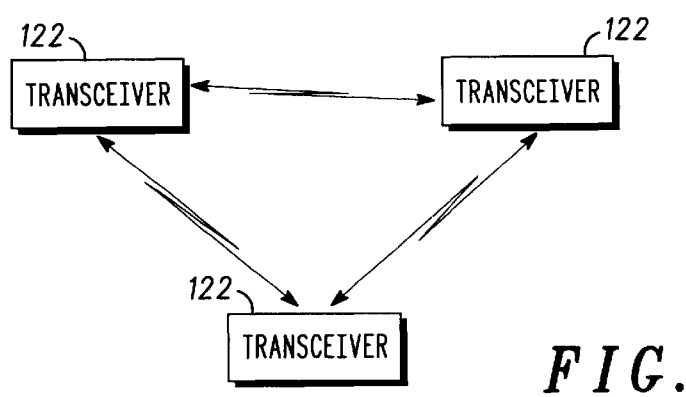
FIG. 2 is an electrical block diagram of an exemplary peer-to-peer mode of operation of the transceivers in accordance with the present invention.

FIG. 2 is an electrical block diagram of an exemplary peer-to-peer mode of operation of the transceivers 122 in accordance with the present invention. In this mode, the transceivers 122 form an ad hoc short range network among themselves. One way of implementing this mode is for one of the transceivers 122 (the "master" transceiver) to assume the role normally played by the base stations 116, in the sense that it transmits on the receive channel of the other transceivers 122 and receives on the transmit channel of the other transceivers 122. The non-master transceivers 122 then can communicate with one another through the master transceiver 122. It will be appreciated that, alternatively, the ad hoc short range network can be implemented in some other manner, e.g., through a single-channel slotted ALOHA technique.

Figure 3:
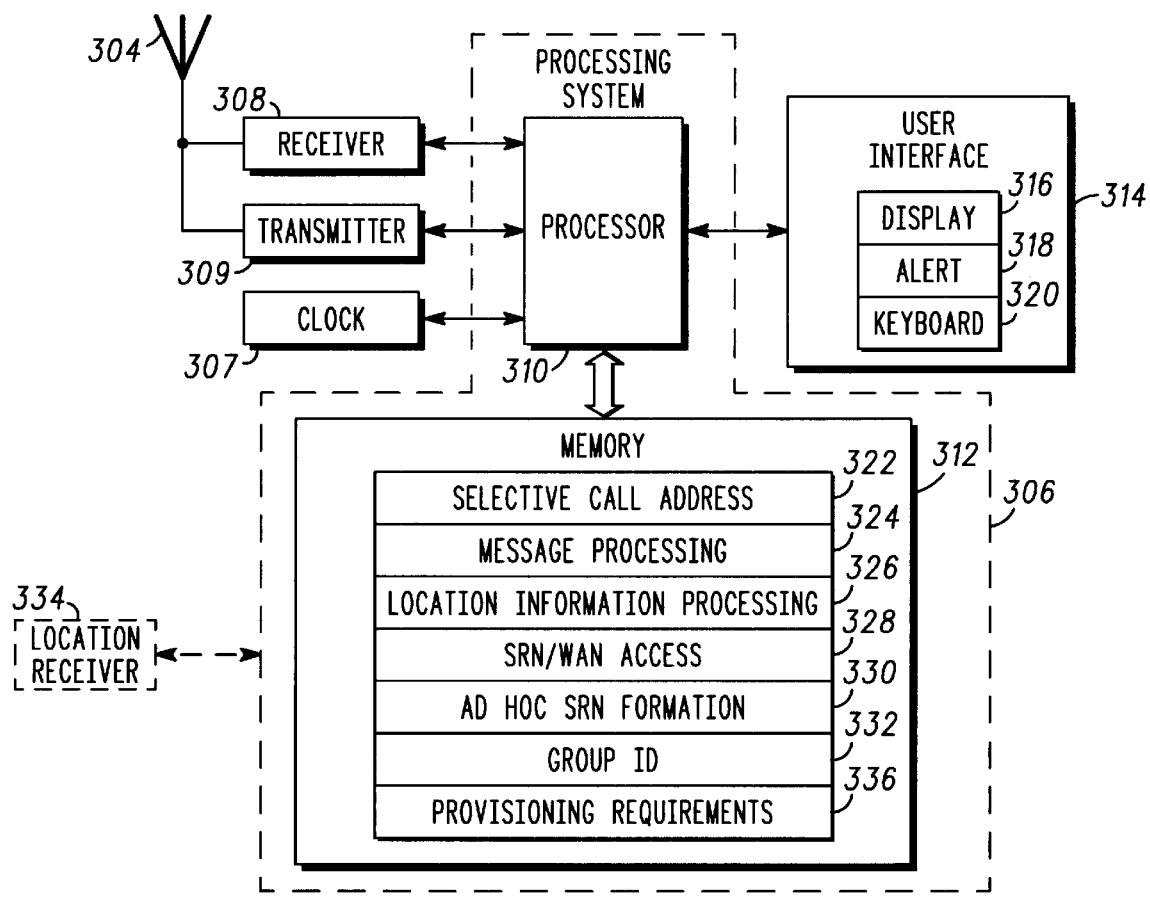
FIG. 3 is an electrical block diagram of an exemplary transceiver in accordance with the present invention.

FIG. 3 is an electrical block diagram of an exemplary transceiver 122 in accordance with the present invention. The transceiver 122 comprises an antenna 304 for intercepting an outbound message and for transmitting an inbound message. The antenna 304 is preferably coupled to a conventional receiver 308 for receiving the outbound message and is coupled to a conventional transmitter 309 for transmitting the inbound message. The receiver 308 and transmitter 309 are coupled to a processing system 306 for processing the outbound and inbound messages and for controlling the transceiver 122 in accordance with the present invention. A user interface 314 preferably is also coupled to the processing system 306 for interfacing with a user. The user interface 314 comprises a conventional keyboard 320 for requesting that an operation be performed and for controlling the transceiver 122, a conventional display 316 for displaying the inbound and outbound messages, and a conventional alert element 318 for alerting the user when an outbound message arrives. A conventional clock 307 is also coupled to the processing system 306 for supporting time keeping requirements of the transceiver 122.

The processing system 306 comprises a conventional processor 310 and a conventional memory 312. The memory 312 comprises software elements and data for programming the processing system 306 in accordance with the present invention. The memory 312 preferably includes a selective call address 322 to which the transceiver 122 is responsive. In addition, the memory 312 includes a message processing element 324 for programming the processing system 306 to process messages through well-known techniques. In one embodiment, the memory 312 further comprises a location information processing program 326 for programming the processing system 306 to cooperate with the controller 112 to process location information through well-known techniques, such as server-assisted GPS techniques. In that embodiment, the transceiver 122 also includes a location receiver 334, such as a GPS receiver, coupled to the processing system 306.

The memory 312 also includes a SRN/WAN access program 328 for programming the processing system to access wireless short range networks (SRNs) and wireless wide area networks (WANs) in accordance with the present invention. The memory 312 also includes an ad hoc SRN formation program 330 for programming the processing system 306 to initiate the formation of an ad hoc SRN with other transceivers 122 near (i.e., within transmission range of) the transceiver 122 in accordance with the present invention. The memory 312 further comprises at least one group identifier 332 for identifying a group to which the transceiver 122 belongs. The memory 312 also includes space for storing provisioning requirements 336 for controlling which and how much information can be shared dependent upon a criterion selected from a group of criteria consisting of a group identifier, a time of day, and a locale. In addition, the memory includes space for storing a list of SRN services, e.g., location information, available from an SRN with which the transceiver 122 is in contact. Operation of the transceiver 122 in accordance with the present invention will be described in detail further below.

Figure 4:
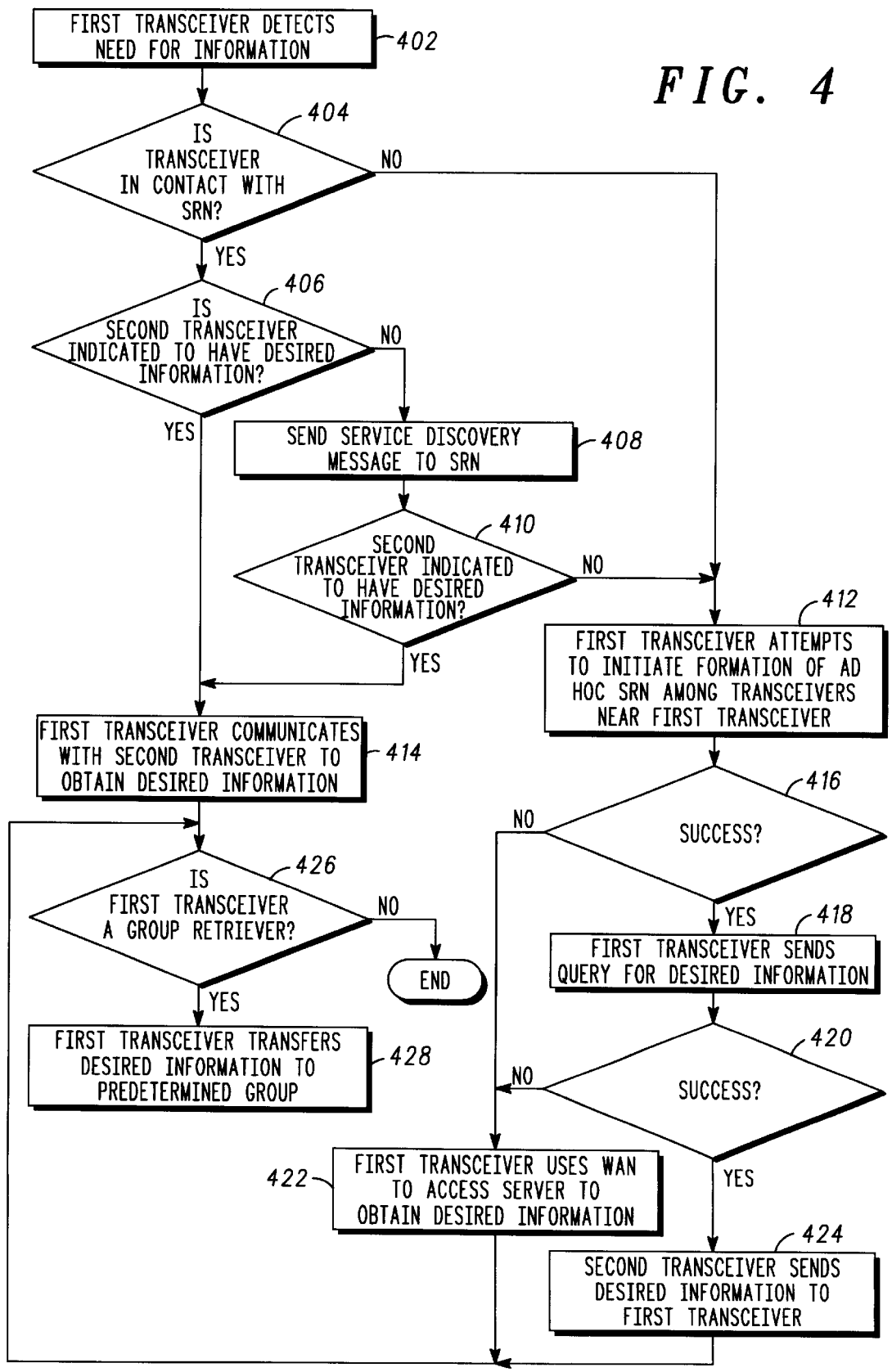
FIGS. 4 and 5 are flow diagrams depicting first and second operations of the transceiver in accordance with the present invention.

FIG. 4 is a flow diagram depicting a first operation of the transceiver 122 in accordance with the present invention. The flow begins when a first transceiver 122 detects 402 a need for information of a particular type, e.g., location information. The processing system 306 then checks 404 whether the first transceiver 122 is in contact with a short range network. If so, the processing system 306 checks 406 the list of SRN services 338 to determine whether a second transceiver 122 in the short range network is indicated to have the desired information. If so, the first transceiver 122 communicates 414 with the second transceiver to obtain the desired information. If, on the other hand, at step 406 no second transceiver is indicated to have the desired information, the first transceiver 122 sends 408 a service discovery message to the short range network to update the list of SRN services 338. The processing system 306 then checks 410 whether the update indicates that a second transceiver 122 has the desired information. If so, the flow moves to step 414 to get the desired information, and thence to step 426. If not, the flow moves to step 412, where the first transceiver 122 attempts to initiate a formation of an ad hoc short range network among other transceivers 122 near, i.e., within range of, the first transceiver 122. It will be appreciated that the formation of the ad hoc short range network can be initiated with selected ones of the other transceivers 122 selected according to a predetermined criterion. For example, the first transceiver 122 can attempt to form the ad hoc short range network with only those transceivers 122 having the same group identifier 332 as itself. In addition, at step 404, when the first transceiver 122 is not in contact with a short range network, the flow also moves to step 412 to attempt to form an ad hoc SRN.

After step 412, the processing system 306 checks 416 whether the attempt was successful. If so, the first transceiver 122 sends 418 a query to the ad hoc short range network for the desired information. If not, the first transceiver 122 uses 422 the wireless wide area network to access the network server 108 to obtain the desired information. Flow then moves to step 426, where the first transceiver 122 checks whether it is a group retriever. If so, the first transceiver 122 transfers 428 the desired information to a predetermined group for which the first transceiver 122 is the group retriever. If not, the process ends. After step 418, the first transceiver 122 checks 420 whether the query was successful. If so, the second transceiver 122 sends 424 the desired information to the first transceiver 122, and the flow moves to step 426. If not, the flow moves to step 422.

It will be appreciated that selected ones of the transceivers 122 can be positioned at fixed locations. An example is a transceiver 122 serving as a wireless interface for a printer. Such a fixed transceiver preferably is pre-programmed with location information describing the location at which the transceiver is placed. It will be further appreciated that, in response to having information that is likely to be of interest to other transceivers 122, a transceiver can advertise the availability of the information, e.g., through periodic transmissions of advertisement messages.

It will also be appreciated that some types of information are relatively sensitive to location. For example, if a transceiver 122 requests server-assisted GPS location information through the WAN, then the responding server must send GPS information received at a location close enough to the transceiver's location to be of use. A similar sensitivity exists when the transceiver 122 requests the local weather forecast. For such location-sensitive information, techniques for limiting the distance between the transceiver 122 and the responding server are preferred. One such technique is for the requesting transceiver 122 to make the request more location specific. For example, the transceiver 122 can request the weather forecast for Dallas, Tex.

Figure 5:
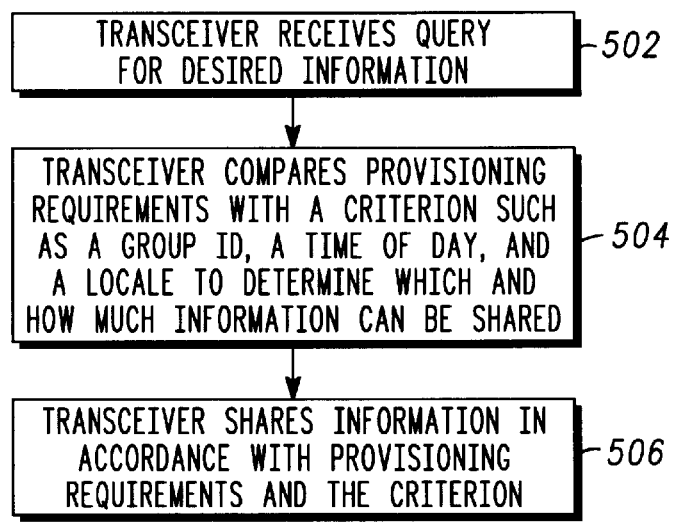

FIG. 5 is a flow diagram depicting a second operation of the transceiver 122 in accordance with the present invention. The flow begins when the transceiver 122 receives 502 a query from another transceiver 122 for some desired information. In response, the transceiver 122 compares 504 its provisioning requirements 336 with a predetermined criterion, such as the group identifier 332 of the requesting transceiver 122, a time of day, or the particular locale in which the short range network is positioned, to determine which and how much information can be shared with the requesting transceiver 122. Then the transceiver 122 shares 506 the information in accordance with the provisioning requirements 336 and the predetermined criterion.

Figure 6:
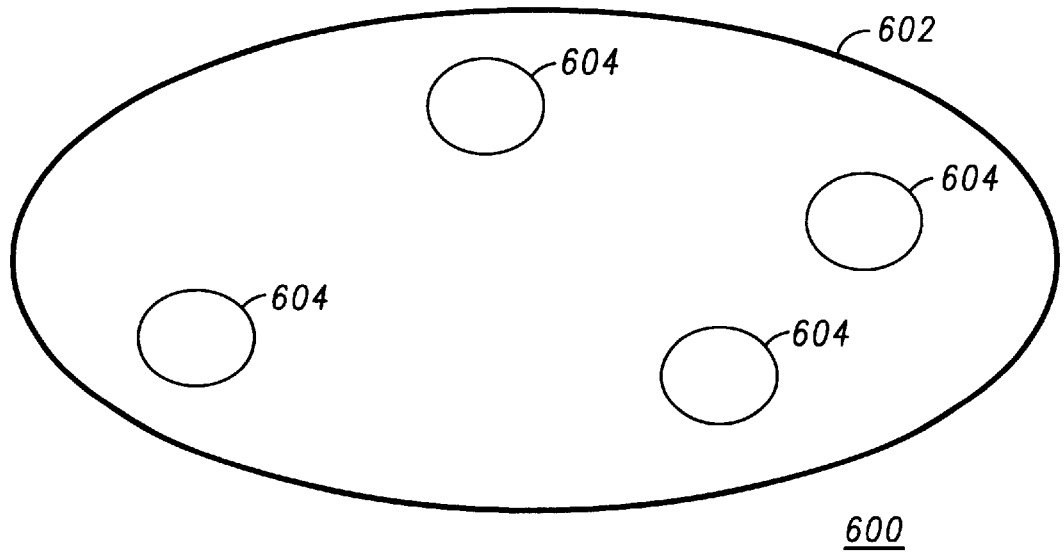
FIG. 6 is a coverage diagram of the exemplary wireless communication system in accordance with the present invention.

FIG. 6 is a coverage diagram 600 of the exemplary wireless communication system in accordance with the present invention. The diagram 600 depicts the wide area network (WAN) wireless coverage area 602, and several short range network (SRN) wireless coverage areas 604 within the WAN wireless coverage area 602. Thus, when possible, the transceivers 122 obtain needed information from one of the SRNs, advantageously reducing traffic in the WAN. When it is not possible to obtain the needed information from one of the SRNs, the transceivers 122 can also obtain the needed information from the WAN.

Thus, it should be clear from the preceding disclosure that the present invention advantageously provides a method and apparatus in a wireless transceiver for seeking and transferring information that is available from a network server. Advantageously, the method and apparatus operates to substantially reduce the wireless WAN traffic required to seek and transfer the information.

Many modifications and variations of the present invention are possible in light of the above teachings. Thus, it is to be understood that, within the scope of the appended claims, the invention can be practiced other than as specifically described herein above.

What is claimed is:

1. A method in a first transceiver of a plurality of wireless transceivers for seeking and transferring desired information that is available from a network server, the method comprising the steps of:

detecting a need for the desired information; and in response to the detecting step and before contacting the network server, attempting to obtain the desired information from another transceiver of the plurality of wireless transceivers near the first transceiver by forming an ad hoc short range network, thereby potentially eliminating a necessity for the first transceiver to contact the network server to obtain the desired information by:

determining whether the first transceiver is in contact with a short range network and has received and stored a list of services available from the short range network; and when the first transceiver is determined to be in contact with the short range network and to have received and stored the list of services available, determining, from the list of services available, whether a second transceiver in the short range network is indicated to have the desired information; and communicating with the second transceiver to obtain the desired information, when the second transceiver is indicated to have the desired information.

2. The method of claim 1, wherein the attempting step comprises the steps of:

determining whether the first transceiver is in contact with a short range network; and when the first transceiver is determined to be in contact with the short range network, but a list of services available does not indicate that the desired information is available from the short range network, sending a service discovery message to the short range network to update the list of services available.

3. The method of claim 1, wherein the first transceiver belongs to a predetermined group of transceivers, and wherein the first transceiver is designated to retrieve the desired information for the predetermined group, and wherein the method further comprises in the first transceiver the steps of:

obtaining the desired information; and transferring the desired information to the predetermined group.

4. The method of claim 1, further comprising the step of
provisioning the plurality of wireless transceivers as to which and how much information can be shared dependent upon a criterion selected from a group of criteria consisting of a group identifier, a time of day, and a locale.

5. The method of claim 1, further comprising the step of
pre-programming fixed ones of the plurality of wireless transceivers with location information corresponding to a location at which each is placed.

6. The method of claim 1, further comprising the step of
advertising, by ones of the plurality of wireless transceivers, availability of the desired information, in response to having the desired information.

7. The method of claim 1, wherein the attempting step comprises the steps of:
testing whether the first transceiver is in contact with a short range network which has the desired information; and
when the first transceiver is found not to be in contact with the short range network which has the desired information, initiating, by the first transceiver a formation of an ad hoc short range network among the plurality of wireless transceivers located near the first transceiver;
sending, from the first transceiver through the ad hoc short range network, a query for the desired information, the query addressed to the plurality of wireless transceivers;
determining in response to the query, by a second transceiver of the plurality of wireless transceivers located near the first transceiver, that the second transceiver has the desired information; and
transmitting, by the second transceiver in response to the determining step, the desired information through the ad hoc short range network to the first transceiver.

8. The method of claim 7, wherein the initiating step comprises the step of
initiating the formation of the ad hoc short range network among selected ones of the plurality of wireless transceivers located near the first transceiver, the selected ones selected according to a predetermined criterion.

9. A first transceiver of a plurality of wireless transceivers for seeking and transferring desired information that is available from a network server, the first transceiver comprising:
a receiver for receiving the desired information;
a transmitter for transmitting the desire information; and
a processing system coupled to the receiver and coupled to the transmitter for processing the desired information, wherein the processing system is programmed to:
detect a need for the desired information; and
in response to the detecting step and before contacting the network server, attempt to obtain the desired information from another transceiver of the plurality of wireless transceivers near the first transceiver by forming an ad hoc short range network, thereby potentially eliminating a necessity for the first transceiver to contact the network server to obtain the desired information by:
determining whether the first transceiver is in contact with a short range network and has received and stored a list of services available from the short range network; and
when the first transceiver is determined to be in contact with the short range network and to have received and stored the list of services available, determining, from the list of services available, whether a second transceiver in the short range network is indicated to have the desired information; and
communicating with the second transceiver to obtain the desired information, when the second transceiver is indicated to have the desired information.

10. The first transceiver of claim 9, wherein the processing system is further programmed to:
determine whether the first transceiver is in contact with a short range network; and
when the first transceiver is determined to be in contact with the short range network, but a list of services available does not indicate that the desired information is available from the short range network, send a service discovery message to the short range network to update the list of services available.

11. The first transceiver of claim 9,
wherein the first transceiver belongs to a predetermined group of transceivers, and
wherein the first transceiver is designated to retrieve the desired information for the predetermined group, and
wherein the processing system is further programmed to:
obtain the desired information; and
transfer the desired information to the predetermined group.

12. The first transceiver of claim 9, wherein the processing system is further programmed to
provision the first transceiver as to which and how much information can be shared dependent upon a criterion selected from a group of criteria consisting of a group identifier, a time of day, and a locale.

13. The first transceiver of claim 9, wherein the processing system is preprogrammed with location information corresponding to a location at which the first transceiver is placed, when the first transceiver is fixed.

14. The first transceiver of claim 9, wherein the processing system is further programmed to
advertise availability of the desired information, in response to having the desired information.

15. The first transceiver of claim 9, wherein the processing system is further programmed to:
test whether the first transceiver is in contact with a short range network which has the desired information; and
when the first transceiver is found not to be in contact with the short range network which has the desired information, initiate a formation of an ad hoc short range network among the plurality of wireless transceivers located near the first transceiver;
send, from the first transceiver through the ad hoc short range network, a query for the desired information, the query addressed to the plurality of wireless transceivers; and
receive, from a second transceiver in response to the query, the desired information through the ad hoc short range network.

16. The first transceiver of claim 15, wherein the processing system is further programmed to
initiate the formation of the ad hoc short range network among selected ones of the plurality of wireless transceivers located near the first transceiver, the selected ones selected according to a predetermined criterion.

* * * * *